United States Patent [19]

Harada et al.

[11] Patent Number: 5,562,954
[45] Date of Patent: Oct. 8, 1996

[54] FIBER REINFORCED PLASTIC AND AN INDICATION METHOD THEREOF

[75] Inventors: Kuniyuki Harada, Ohta; Kazutaka Sawada, Isesaki; Yoshiteru Hosoya, Iyoku; Tetsuo Shibusawa, Ohta, all of Japan

[73] Assignee: Fuji Jukogyo Kabushiki Kaisha, Tokyo, Japan

[21] Appl. No.: 455,408

[22] Filed: May 31, 1995

Related U.S. Application Data

[62] Division of Ser. No. 193,547, Feb. 8, 1994, Pat. No. 5,464,671.

[30] Foreign Application Priority Data

Feb. 26, 1993 [JP] Japan .......................... 62934

[51] Int. Cl.$^6$ .................. B29C 41/34; B29C 67/14; B32B 33/00; C09C 3/00
[52] U.S. Cl. .................. 428/13; 428/77; 428/78; 428/79; 428/903.3; 180/89.1; 180/84; 280/727
[58] Field of Search .................. 428/77, 78, 79, 428/46, 903.3, 13; 180/274, 89.1, 84; 280/788, 727

[56] References Cited

U.S. PATENT DOCUMENTS 3,957,943  5/1976  Ogura .
4,869,941  9/1989  Ohki .

FOREIGN PATENT DOCUMENTS 549213  12/1992  European Pat. Off. .

Primary Examiner—N. Edwards
Assistant Examiner—Richard Weisberger
Attorney, Agent, or Firm—Beveridge, DeGrandi, Weilacher & Young, L.L.P.

[57] ABSTRACT

A fiber reinforced plastic (FRP) product having a label that includes information pertaining to the type of material of the product for recycling purposes. The label is covered on its back surface side with a transparent surface mat. The product is formed by coating a surface of a mold with a gel coating to become an outer surface through a mold release agent, laying a glass mat of unsaturated polyester resin-impregnated reinforced fiber on the gel coating, further laying a glass mat of the same material and applying pressure of a roller or a brush on the gel coating, laying a label with printed material for indicating the material at an arbitrary position on one of the glass mats, laying, for example, a transparent surface mat of unsaturated polyester resin-impregnated glass fiber by pressure of a presser such as a roller or a brush or the like on the label, and consolidating each of the components to form the final product. Thus, the indication of the material of the FRP product that is displayed on a back surface side of the hand-lay-up FRP product can be accurately confirmed from the outside for a long period of time.

15 Claims, 1 Drawing Sheet

FIBER REINFORCED PLASTIC AND AN INDICATION METHOD THEREOF

This is a divisional of a application Ser. No. 08/193,547 filed on Feb. 8, 1994, now U.S. Pat. No. 5,464,621 which is incorporated herein by reference.

BACKGROUND OF THE INVENTION

This invention relates to a fiber reinforced plastic (FRP) and an indication method thereof.

A policy for improving fuel consumption of a vehicle by a reduction in its weight by replacing the vehicle's metal components with plastic components has been heretofore employed. An FRP product is used for a component which needs a predetermined strength such as a bumper for the vehicle, (e.g., Japanese Patent Laid-Open Publication No. 2756/1990).

On the other hand, in order to economize resources of the earth, a recycling of an FRP product has been conducted. To recycle the FRP product, it is necessary to clearly indicate the material of the FRP product so as to be seen from outside. Heretofore, a method for bonding a printed label printed with the material of the FRP product to the back surface of the FRP product or molding characters for indicating the material of the FRP product in a mold has been employed.

However, when an indication method for a material of an FRP product which has been heretofore conducted is intended to be applied to a hand-lay-up FRP product, the following various problems arise.

More specifically, since the hand-lay-up FRP product is molded by alternately hand laying a synthetic resin on a resin-impregnated FRP mat by using only one mold of a front surface side and hardening the back surface of the FRP product by pressure of a roller or a brush, the back surface of the FRP product is rugged which is improper to bond a label or the like, and there arises a problem that, even if a printed label is adhered, the label is frequently peeled.

Furthermore, since a method for molding characters on a back surface of an FRP product in a mold must prepare a special purpose character die, its cost increases, and yet the molded characters are scarcely read by the use for a long period. Thus, in the case of recycling, it is frequently difficult to read the molded characters.

In addition, there also arise problems that both a method for bonding the printed label and a method for molding characters in a mold are difficult to be applied to a curved surface and limited to a flat surface.

SUMMARY OF THE INVENTION

The present invention has for its object to provide an FRP and an indication method thereof which overcome various drawbacks of a conventional indication method for a material of the hand-lay-up FRP.

In order to achieve the above object, this invention provides an FRP and an indication method thereof comprising the steps of alternatively overlaying an FRP mat on a resin-impregnated FRP mat (a fiber reinforced, uncured thermoset prepolymer resin mat) in a mold, laying a printed material on said FRP product, impregnating a synthetic resin into a transparent surface mat, covering said printed material with said transparent surface mat, and hardening or consolidating said FRP product by pressure in said mold.

According to the arrangement as described above, the printed material laid on the FRP product integrally covered with the transparent surface mat is not absolutely peeled for a long period of time and is not difficult to read upon exposure water and dust, and in the case of recycling the FRP product, the material of the FRP product can be positively visually recognized from the exterior.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

The embodiment of this invention will be explained with reference to the accompanying drawings.

Figure 2A:
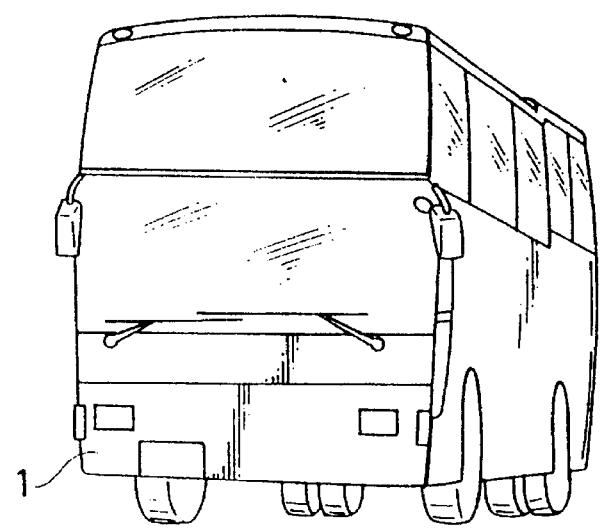
FIG. 2A is a perspective view showing an example of an FRP hand-lay-up product to be applied by the present invention, illustrating an external appearance of a front part of a bus.
Figure 2B:
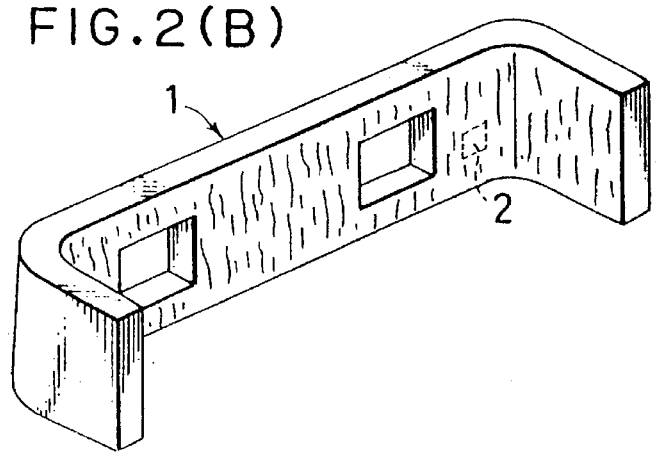
FIG. 2B is a perspective view of a bumper for a bus.

In this embodiment, an example of the case where a bumper 1 of a bus shown in FIG. 2 is made of a hand-lay-up FRP product will be described.

Figure 1:
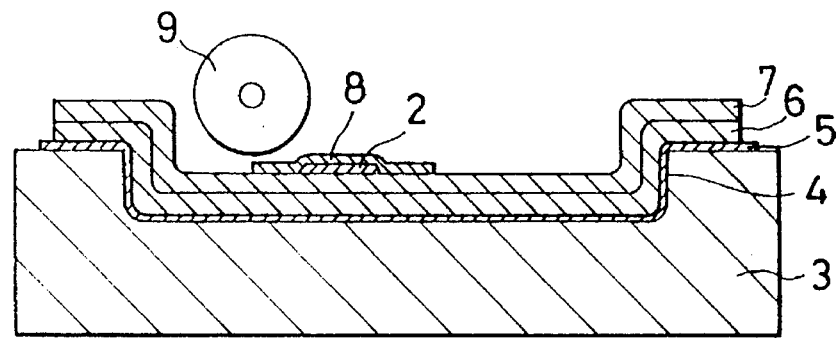
FIG. 1 is a sectional view showing an embodiment of the present invention for describing an example of a hand laying procedure of an FRP hand-lay-up product.

In FIG. 1, numeral 3 indicates a mold having a mold surface coincident with a shape of a product to be molded, i.e., a bumper 1 for a bus at the side of its outer surface. The surface of the mold 3 is uniformly coated with mold release agent 4, and further coated by a sprayer with gel coating 5 about 0.3 to 0.5 mm thick to become an outer surface of the bumper 1. Then, a glass mat 6 of unsaturated polyester resin-impregnated reinforced fiber is laid on the gel coating 5, and hardened by pressure of a presser 9 such as a roller or a brush to be draped with the mold surface of the mold 3. Further, a glass mat 7 of unsaturated polyester resin-impregnated reinforced fiber is overlaid on the glass mat 6, and hardened sufficiently by pressure of the presser 9 such as the roller or the brush to the mold surface, and air residue and excessive resin are extruded. Immediately thereafter, a printed material 2 for indicating the material of the FRP product (the material of synthetic resin, the material and the state of the reinforced fiber, the content of the reinforced fiber and the like) is laid at a suitable place (which is not limited to a flat surface but may be a curved surface) while the product is half-hardened or oligomer in the mold, and a thin and transparent surface mat 8 of unsaturated polyester resin-impregnated glass fiber is, for example, laid by pressure of the presser 9 such as the roller or the brush on the printed material 2. Then, a bumper constituting layer of the gel coating 5, the glass mat 6 of the first layer and the glass mat 7 of the second layer and the surface mat 8 are simultaneously hardened by pressure to obtain the bumper 1.

In the bumper 1 arranged as described above, a size of the printed material 2 is normally formed in the degree of a size of a calling name card (about 55 mm×91 mm). Normal paper can be applied to the material of the printed material 2, which reduces its cost and provides a simple operation. The bumper 1 for the bus has a mass of about 20 kg., and even if paper (printed material) in the degree of card size is mixed as a foreign matter with the bumper 1, recycling of the FRP product is not affected by adverse influence. In addition to the normal paper as the material of the printed material 2, a plastic thin film and the like may be available.

It is desirable to reduce in thickness the surface mat 8 so as not to impair its transparency for a long period of time.

After the surface mat 8 is laid on the bumper constituting layer by pressure of the presser 9, when the surface mat 8 is hardened at a so-called ambient temperature (about 10° to 35° C.), the surface mat 8 is left to stand for about 4 to 16 hours in the mold 3. When the surface mat 8 is hardened at 40° to 60° C., the surface mat 8 is left to stand for about 2 hours in the mold 3.

In the bumper 1 obtained as described above, the printed material 2 printed with the material at an arbitrary position of its back surface is integrally laid on the transparent surface mat 8. Thus, the printed material 2 is not peeled and not to be unable to be read. In the case of recycling, the material of the bumper 1 can be sufficiently clearly confirmed.

Incidentally, if the surface mat is laid on the glass mat which has already been hardened and hardened by pressure to be bonded, when the mat is dipped in water for about 2 days, it is confirmed that peeling occurs between the glass mat and the surface mat. As in the embodiment described above, indication of the material which is not apprehended to be peeled for a long period of time can be conducted by molding and hardening together the bumper constituting layer and the surface mat.

The above-described embodiment has been described with respect to the bumper for the bus as the hand-lay-up FRP product. However, the present invention is not limited to the particular embodiment.

According to the present invention as described above, the printed material of paper for indicating the material of the hand-lay-up FRP product is so laid on the FRP product, as to be sufficiently read from outside. Therefore, the printed material is not peeled to be removed. The display is not scarcely read upon exposure with water or dusts. In the case of recycling, the material can be firmly visually confirmed. The printed material can be easily provided not only on a flat surface but also on a curved surface to be reduced in cost and simplified in an operation, thereby providing large effect in practice.

while the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A vehicle bumper comprising:
   a first resin impregnated fiber mat and a second resin impregnated fiber mat with one of said mats alternatively overlaid with respect to the other of said mats;
   a label containing information thereon, said label being in contact with said one of said fiber mats based on the laying of said label on said one of said fiber mats while said one of said fiber mats is in a non-completely hardened state;
   a transparent surface mat impregnated with a resin and overlaying said label such that the information on said label is viewable.

2. A vehicle bumper, comprising:
   a first glass mat of unsaturated polyester resin-impregnated reinforced fiber as an exterior layer;
   a second glass mat of unsaturated polyester resin impregnated reinforced fiber fixed to said first glass mat and forming an interior layer of said bumper,
   a label having a surface secured to said second glass mat based on an application of said label on said second glass mat while said second glass mat is in a non-hardened state, said label having recycling information thereon;
   a transparent surface mat of unsaturated polyester resin-impregnated glass fiber positioned over said label and joined with said second glass mat.

3. A bumper as recited in claim 2 wherein said label is positioned on a curved surface of said fiber reinforced plastic product.

4. A bumper as recited in claim 1 wherein said first, second and transparent fiber reinforced mats are reinforced with a glass fiber.

5. A bumper as recited in claim 4 wherein said first, second and transparent mats are formed of an unsaturated polyester resin.

6. A bumper as recited in claim 1 wherein said first, second and transparent mats are formed of an unsaturated polyester resin.

7. A bumper as recited in claim 1 wherein said first, second and transparent mats are impregnated with a thermoset prepolymer resin.

8. A bumper as recited in claim 1 wherein said label contains information about a material of at least one of said mats to facilitate recycling.

9. A bumper as recited in claim 1 wherein said label is laid on one of said first and second mats while said one of said first and second mats is in an oligomer state.

10. A vehicle bumper as recited in claim 1 wherein said label and transparent mat are in contact with a curved surface of one of said first and second mats.

11. A vehicle bumper as recited in claim 1 wherein said bumper is dimensioned and arranged for attachment to an automobile.

12. A bumper as recited in claim 2 wherein said label is integral with said second glass mat and surface mat as said surface mat, label and second glass mat are consolidated when both said surface mat and second glass mat are in a non-hardened state.

13. A vehicle bumper, comprising:
    a body formed of a fiber reinforced unsaturated polyester resin;
    a label containing information thereon, said label being supported by said body;
    a transparent surface mat comprised of a transparent glass fiber mat which is impregnated with unsaturated polyester resin which is transparent in its final state, said transparent surface covering said label and being joined about its periphery with said body such that the information contained in said label is viewable.

14. A vehicle bumper as recited in claim 13 wherein said label is integral with said body and surface mat as said surface mat, label and body are consolidated when both said body and surface mat are in a non-hardened state.

15. A vehicle bumper as recited in claim 13 wherein said label includes information representing a material type to facilitate recycling of said bumper.

* * * * *